(12) United States Patent
Hristovski et al.

(10) Patent No.: US 9,878,320 B2
(45) Date of Patent: Jan. 30, 2018

(54) MICROWAVE ASSISTED SYNTHESIS OF METAL DIOXIDE BASED HYBRID MEDIA

(71) Applicants: Kiril D. Hristovski, Mesa, AZ (US); Paul K. Westerhoff, Scottsdale, AZ (US)

(72) Inventors: Kiril D. Hristovski, Mesa, AZ (US); Paul K. Westerhoff, Scottsdale, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 286 days.

(21) Appl. No.: 14/796,156

(22) Filed: Jul. 10, 2015

(65) Prior Publication Data
US 2016/0008805 A1 Jan. 14, 2016

Related U.S. Application Data

(60) Provisional application No. 62/023,316, filed on Jul. 11, 2014.

(51) Int. Cl.
| | |
|---|---|
| *B01J 41/02* | (2006.01) |
| *B01J 41/18* | (2017.01) |
| *B01J 41/10* | (2006.01) |
| *C02F 1/42* | (2006.01) |
| *C02F 1/28* | (2006.01) |
| *C02F 101/10* | (2006.01) |
| *C02F 101/22* | (2006.01) |
| *C02F 101/16* | (2006.01) |

(52) U.S. Cl.
CPC ............... *B01J 41/02* (2013.01); *B01J 41/10* (2013.01); *B01J 41/18* (2013.01); *C02F 1/288* (2013.01); *C02F 1/42* (2013.01); *C02F 1/281* (2013.01); *C02F 1/283* (2013.01); *C02F 2101/103* (2013.01); *C02F 2101/105* (2013.01); *C02F 2101/163* (2013.01); *C02F 2101/22* (2013.01)

(58) Field of Classification Search
None
See application file for complete search history.

(56) References Cited

U.S. PATENT DOCUMENTS

| | | | | |
|---|---|---|---|---|
| 4,434,138 A | * | 2/1984 | Lee | B01J 39/12 423/7 |
| 2005/0156136 A1 | | 7/2005 | SenGupta et al. | |

OTHER PUBLICATIONS

Qi, Chao et al., "Microwave Hydrothermal Transformation of Amorphous Calcium carbonate Nanospheres and Application in Protein Adsorption," ACS Applied Materials & Interfaces, 2014 (6) p. 4310-4320.*

(Continued)

*Primary Examiner* — Chester T Barry
(74) *Attorney, Agent, or Firm* — Fish & Richardson P.C.

(57) ABSTRACT

Hybrid media formed by combining a metal precursor solution with particulate media to yield a mixture, decanting the mixture to yield a decanted mixture, heating the decanted mixture in via microwave radiation to yield hybrid media, rinsing the hybrid media with water, soaking the rinsed hybrid media in a salt solution, and rinsing the soaked hybrid media with water. The hybrid media includes a metal dioxide derived from the metal precursor, such as $TiO_2$ derived from $TiOSO_4$.

14 Claims, 5 Drawing Sheets

(56) References Cited

OTHER PUBLICATIONS

Cumbal et al. (2005). "Arsenic Removal Using Polymer-Supported Hydrated Iron(III) Oxide Nanoparticles: Role of Donnan Membrane Effect," Environ. Sci. Technol. 39, 6508-6515.

Hristovski et al. (2008). "Simultaneous removal of perchlorate and arsenate by ion-exchange media modified with nanostructured iron (hydr)oxide," J. Hazard. Mater. 152, 397-406.

Gu et al. (2005). "Sorption and Desorption of Perchlorate and U(VI) by Strong-Base Anion-Exchange Resins," Environ. Sci. Technol. 39, 901-907.

Tripp et al. (Apr. 2006). "Ion exchange for the remediation of perchlorate-contaminated drinking water," J. Am. Water Works Assoc. 98, 105-114.

Sherman et al. (2003). "Surface complexation of arsenic(V) to iron(III) (hydr)oxides: Structural mechanism from ab initio molecular geometries and EXAFS spectroscopy," Geochim. Et Cosmochim. 67 (22), 4223-4230.

Lenoble et al. (2002). "Arsenic Adsorption onto Pillared Clays and Iron Oxides," J. Colloid and Interface Sci. 255, 52-58.

Badruzzaman et al. (2004). "Intraparticle diffusion and adsorption of arsenate onto granular ferric hydroxide (GFH)," Water Res. 38, 4002-4012.

Westerhoof et al. (Feb. 2005). "Rapid Small-Scale col. Tests for Arsenate Removal in Iron Oxide Packed Bed Columns," J. Environ. Eng. Asce. 131, 262-271.

Bang et al. (2005). "Removal of arsenic from groundwater by granular titanium dioxide adsorbent," Chemosphere 60, 389-397.

Gu et al. (2005). "Preparation and Evaluation of GAC-Based Iron-Containing Adsorbents for Arsenic Removal," Environ. Sci. Technol. 39, 3833-3843.

Demarco et al. (2003). "Arsenic removal using a polymeric/inorganic hybrid sorbent," Water Res. 37, 164-176.

Zhang et al. (2005). "Iron oxide-loaded slag for arsenic removal from aqueous system," Chemosphere 60, 319-325.

Knappe et al. (Oct. 1999). "Atrazine removal by preloaded GAC," J. Am. Water Works Assoc. 91, 97-109.

Sperlich et al. (2005). "Breakthrough behavior of granular ferric hydroxide (GFH) fixed-bed adsorption filters: modeling and experimental approaches," Water Res. 39, 1190-1198.

Mohan et al. (2007). "Arsenic removal from water/wastewater using adsorbents—A critical review," J. Hazard. Mater. 142, 1-53.

Gao et al. (1995). "A new hybrid inorganic sorbent for heavy metals removal," Water Res. 29 (9), 2195-2205.

Suzuki et al. (2000). "Preparation of porous resin loaded with crystalline hydrous zirconium oxide and its application to the removal of arsenic," React. Funct. Polym. 43, 165-172.

Dutta et al. (2004). "Adsorption of arsenate and arsenite on titanium dioxide suspensions," J. Colloid Interface Sci. 278, 270-275.

Yuchi et al. (2003). "Preconcentration of phosphate and arsenate at sub-ng ml-1 level with a chelating polymer-gel loaded with zirconium(IV)," Anal. Chim. Acta 494, 81-86.

Dixit et al. (2003). "Comparison of Arsenic(V) and Arsenic(III) Sorption onto Iron Oxide Minerals: Implications for Arsenic Mobility," Environ. Sci. Technol. 37, 4182-4189.

Cumbal et al. (2003). "Polymer supported inorganic nanoparticles: characterization and environmental applications," React. Funct. Polym. 54, 167-180.

Donnan (1995). "Theory of membrane equilibria and membrane potentials in the presence of non-dialysing electrolytes. A contribution to physical-chemical physiology," J. Membr. Sci. 100, 45-55.

Zhao et al. (1998). "Ultimate removal of phosphate from wastewater using a new class of polymeric ion exchangers," Water Res. 32 (5), 1613-1625.

Ramana et al. (1992). "Removing Selenium (IV) and Arsenic (V) oxyanions with tailored chelating polymers," J. Environ. Eng. 118 (5), 755-775.

\* cited by examiner

MICROWAVE ASSISTED SYNTHESIS OF METAL DIOXIDE BASED HYBRID MEDIA

CROSS-REFERENCE TO RELATED APPLICATION

This application claims priority to U.S. Ser. No. 62/023,316, filed Jul. 11, 2014, and entitled "MICROWAVE ASSISTED SYNTHESIS OF METAL DIOXIDE BASED HYBRID MEDIA," which is incorporated by reference herein in its entirety.

TECHNICAL FIELD

This invention relates to microwave assisted synthesis of metal dioxide based hybrid ion exchange media for removing strong acid anion and weak acid oxo-anion contaminants from water, as well as hybrid media for removing organic and weak acid oxo-anion contaminants from water.

BACKGROUND

Hybrid ion exchange media capable of simultaneous removal of strong acid anions (e.g., nitrate, perchlorate, and the like) and weak acid oxo-anions (e.g., arsenate, arsenite, chromate, phosphate, and the like) has been prepared by combining iron (hydr)oxides (mixed compounds of oxides, hydroxides, and oxy-hydroxides) and strong base ion exchange media. Similarly, activated carbon and other carbonaceous sorbent media have been combined with iron (hydr)oxides to develop hybrid media for simultaneous removal of organic and oxo-anion contaminants. The stability of iron (hydr)oxide in water, however, is less than desirable. The high cost of precursors other iron hydr(oxide) has limited the use of other materials in the development of hybrid ion-exchange media and sorbent media.

SUMMARY

A low energy microwave assisted process to synthesize metal dioxide based hybrid ion exchange media capable of simultaneous removal of strong acid ion and weak acid oxo-anion contaminants from water is disclosed. This process can also be used to synthesize metal dioxide based hybrid ion media (sorbents) capable of simultaneous removal of organic and weak acid oxo-anion contaminants from water. The synthesis is achieved on the order of minutes, and thus requires less than 1/100 of the time required by current processes, and therefore requires less energy. Highly porous nanostructured metal oxides can be prepared by ashing the hybrid ion media. The nanostructured metal oxides have a high surface area, and are useful as photocatalysts and for removing arsenic and other oxo-anion contaminants from water.

In a first general aspect, hybrid media is formed by combining a metal precursor solution with particulate media to yield a mixture, decanting the mixture to yield a decanted mixture, heating the decanted mixture in via microwave radiation to yield hybrid media, rinsing the hybrid media with water, soaking the rinsed hybrid media in a salt solution, and rinsing the soaked hybrid media with water. The hybrid media includes a metal dioxide derived from the metal precursor.

Implementations of the first general aspect may include one or more of the following features. For example, forming the hybrid media may include preparing the metal precursor solution before combining the metal precursor solution with the particulate media. The decanted mixture may be heated to a temperature of at least 100° C. In some cases, the rinsed hybrid media may be washed until metal dioxide particles are not visible in the wash water. In certain cases, rinsing the hybrid media with water includes rinsing the hybrid media with water until the rinse water is free of metal dioxide particles. The rinsed, soaked hybrid media may be ashed to yield a porous nanostructured metal oxide. Ashing the rinsed, soaked hybrid media may include heating the rinsed, soaked hybrid media to a temperature in a range between 500° C. and 600° C.

The hybrid media may be contacted with contaminated water including strong acid ions, weak acid oxo-anions, or a combination thereof, thereby removing at least some of the strong acid ions and some of the weak acid oxo-anions from the contaminated water. The strong acid ions may be selected from the group consisting of nitrate and chlorate. The weak acid oxo-anions may be selected from the group consisting of arsenate, arsenite, chromate, and phosphate.

The particulate media may include ion exchange media (e.g., strong base ion exchange media or weak base ion exchange media) or activated carbon based media. When the particulate media includes activated carbon based media, contacting the hybrid media with contaminated water including organic compounds, weak acid oxo-anions, or a combination thereof removes at least some of the organic compounds and the weak acid oxo-anions from the contaminated water.

The metal of the metal precursor may be titanium or zirconium. The anion of the metal precursor may be an oxosulfate, oxonitrate, or oxochloride. The concentration of the metal precursor in the metal precursor solution is between 1 g/L and 124 g/L. In some cases, the metal precursor solution is saturated. The volume ratio of the metal precursor solution to the particulate media is typically in a range of 1:1 to 3:1. The salt solution may be a sodium chloride solution, and the sodium chloride solution is typically 1 wt % to 10 wt % sodium chloride.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

A low energy microwave assisted process to synthesize metal dioxide based hybrid ion exchange media capable of simultaneous removal of strong acid ions (e.g., nitrate, perchlorate, and the like) and weak acid oxo-anions (e.g., arsenate, arsenite, chromate, phosphate, and the like) from water is disclosed. Granular activated carbon or other carbonaceous media can also be used to create hybrid media capable of simultaneous removal of organic and weak acid oxo-anion contaminants from water. The synthesis process is advantageously simple, inexpensive, quick, and energy efficient, and may easily be modified for manufacturing of large quantities of metal dioxide hybrid ion exchange media or sorbent media.

Figure 1:
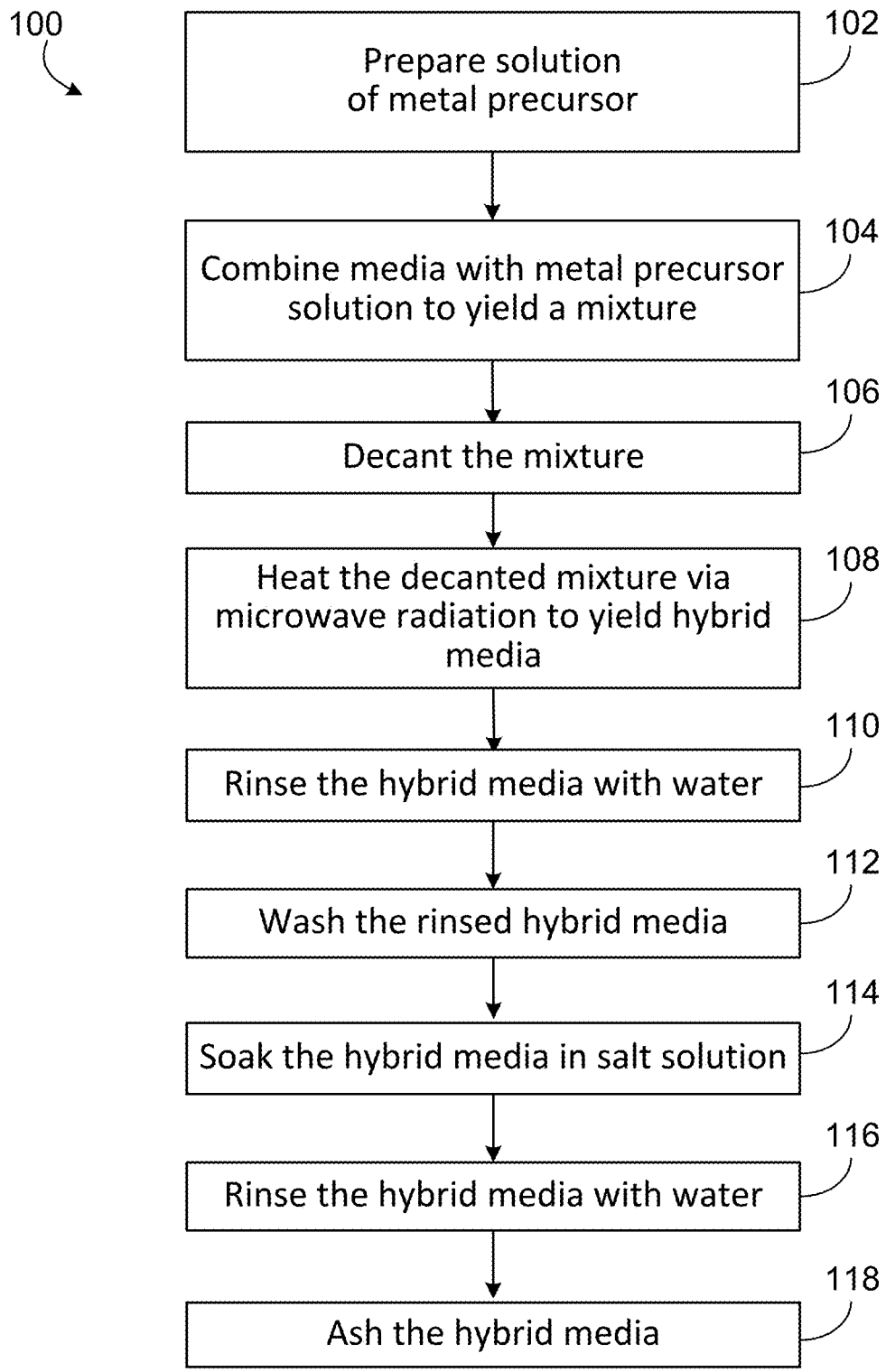
FIG. 1 is a flow chart showing a low energy microwave assisted process to synthesize metal dioxide based hybrid media.

FIG. 1 is a flowchart showing process 100 for synthesizing hybrid media for simultaneous removal of strong acid ion and weak acid oxo-anion contaminants, as well as hybrid media for simultaneous removal of organic and weak acid oxo-anion contaminants from water. In 102, a solution of metal precursor is prepared by dissolving a metal precursor in water. Suitable metals include titanium, zirconium, and other similar metals. Suitable metal precursors include metal oxosulfates (e.g., $TiOSO_4$, $ZrOSO_4$), metal oxonitrates, and metal oxochlorides. The concentration of the metal precursor in the solution ranges between 1 g/L and 124 g/L. In some cases, the metal precursor solution is a saturated solution. The precursor solution is typically clear and free of visible particulate matter.

In 104, particulate media (e.g., wet ion exchange or sorbent media) is combined with the metal precursor solution to form a mixture. Examples of suitable ion exchange media include strong-base ion exchange media such as RESINTECH SIR-100, and weak-base ion exchange media such as AMBERLITE™ PWA7. Examples of suitable activated carbon based media include NORIT® HYDRODARCO® HD-3000 and Calgon F400. The activated carbon based media is typically presoaked in ultrapure water. The mixture may be sealed in a closed container after the ion exchange or sorbent media and metal precursor solution are combined. The volume ratio of metal precursor solution to ion exchange or sorbent media is typically in a range of 1:1 to 3:1 (e.g., 1.5:1, 2:1, or 2.5:1), depending on the type of ion exchange or sorbent media used. The mixture is agitated (e.g., stirred or shaken) for a length of time (e.g., at least 5 minutes).

In 106, the mixture is decanted to remove excess metal precursor solution, leaving a decanted mixture. The decanted mixture includes the soaked media and the remaining (undecanted) liquid. The liquid may just cover the soaked media. In 108, the decanted mixture is heated to 100° C. to yield the hybrid media. Heating occurs for a length of time (e.g., at least 5 minutes) by microwave radiation, and the temperature of the decanted mixture is allowed to reach 100° C. For example, irradiation for 60 sec with 800 W regular microwave at maximum power output is sufficient to heat 100 mL of precursor/water solution at room temperature to 90° C. In some cases, the temperature increase profile is about 1° C./min. The heating promotes formation of metal dioxide via hydrolysis, yielding the hybrid media. In 110, the hybrid media is rinsed with water (e.g., ultrapure water) until the rinse water is free of metal dioxide particles, and the pH of the rinse ultrapure water is greater than 4.5. The presence of metal dioxide particles can be determined visually. In 112, the rinsed hybrid media is washed (e.g., once or more than once) with deionized water. In 114, the washed hybrid media is soaked in a sodium chloride solution for a length of time (e.g., at least 12 hours) to convert counter ions of the ion-exchange group into chloride form. The concentration of the sodium chloride solution may range from 1 wt % to 20 wt % (e.g., 5 wt % to 15 wt %, or about 10 wt %). In 116, the hybrid media is rinsed with ultrapure water to remove excess salt. After rinsing, the hybrid media may be stored wet before use. The wet hybrid media is suitable for simultaneous removal of multiple contaminants from water.

In 118, the hybrid media from 116 may be ashed to provide a porous nanostructured metal dioxide media with high surface area. Ashing may be performed at a temperature in a range between 500° C. and 600° C. (e.g., 550° C.). The resulting nanostructured metal dioxide media is suitable for use as a photocatalyst or for simultaneous removal of multiple contaminants from water.

EXAMPLES

Example 1

A saturated solution of titanium oxosulfate ($TiOSO_4$) was prepared by dissolving $TiOSO_4$ in 1 L of water. The solution was clear and free of particulate matter. Granular activated carbon (GAC) HD-3000 (HydroDarco 3000, NORIT Americas Inc.), presoaked in ultrapure water, was mixed with the saturated $TiOSO_4$ solution in a closed vessel for at least 5 minutes. The ratio of $TiOSO_4$ solution to GAC was 2:1 by volume.

Figure 2:
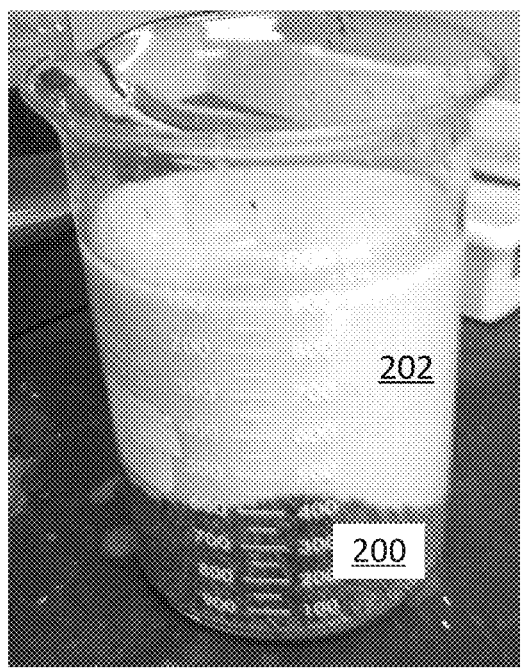
FIG. 2 is a photographic image of titanium dioxide containing granular activated carbon (hybrid Ti-GAC) media after microwave synthesis and during the rinsing and washing process as described in Example 1.
Figure 3:
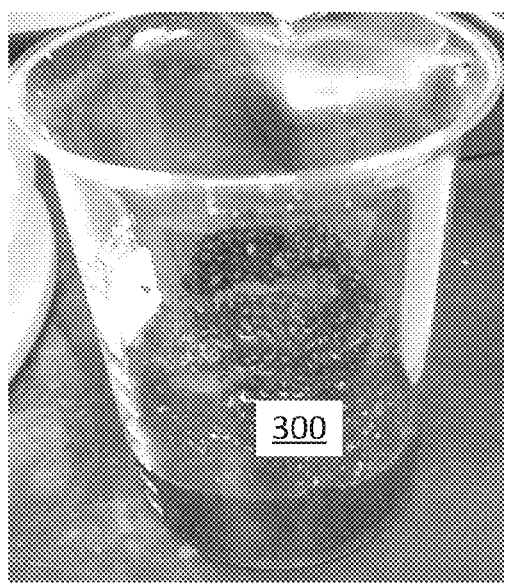
FIG. 3 is a photographic image of titanium dioxide containing granular activated carbon (hybrid Ti-GAC) media after washing and decanting as described in Example 1.

After the mixing, the excess $TiOSO_4$ solution was decanted until the soaked media was barely covered. The decanted mixture was then transferred to a microwave vessel, and heated to 100° C. for 5 minutes, allowing some time for temperature to reach 100° C. The resulting hybrid media was then removed from the microwave vessel and rinsed with ultrapure water until no excess $TiO_2$ particles were dispersed in the water. FIG. 2 shows the hybrid media (titanium dioxide containing GAC media or hybrid Ti-GAC media) after the microwave synthesis and during the rinsing and washing process. The black slurry 200 is the hybrid Ti-GAC media, while the white milky dispersion 202 is the excess $TiO_2$. After the ultrapure rinse, the hybrid media was washed repeatedly with deionized water, soaked in 5% sodium chloride solution overnight, rinsed with ultrapure water to remove excess salt, and stored wet before use. FIG. 3 shows the hybrid media 300 after excess $TiO_2$ has been washed off, and the hybrid media is ready for use as a hybrid sorbent to simultaneously remove organic and oxo-anion contaminants.

Figure 4:
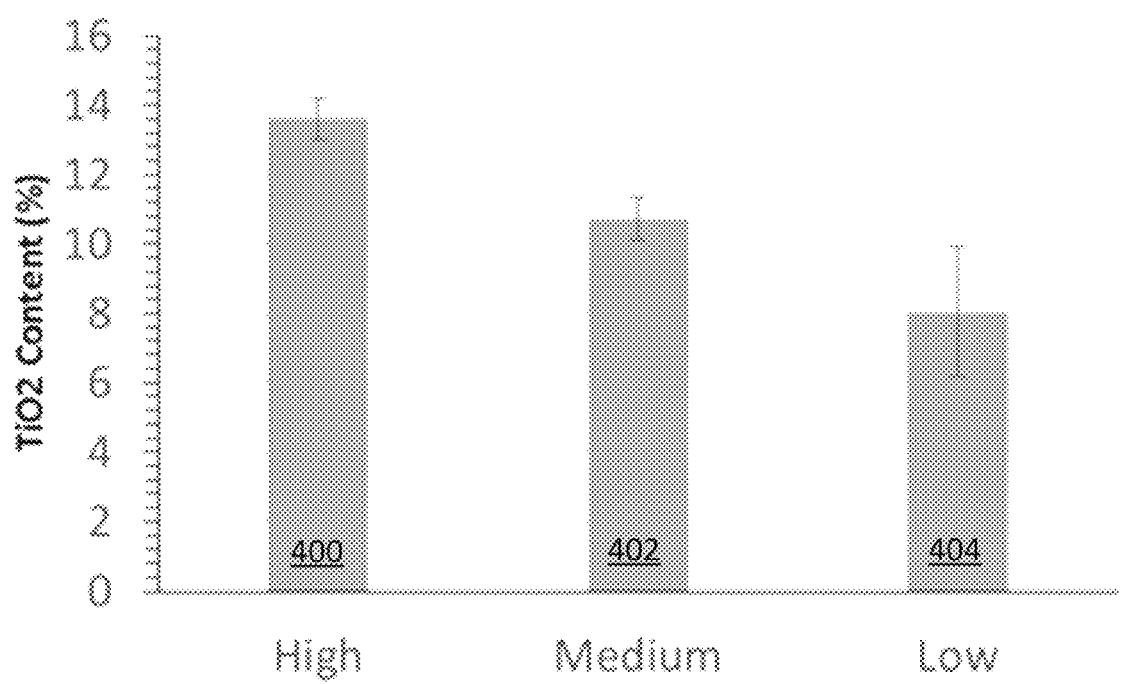
FIG. 4 is a bar graph showing titanium dioxide content in hybrid Ti-GAC media prepared as described in Example 1.

FIG. 4 is a bar graph showing titanium dioxide content in the hybrid Ti-GAC media as determined by triplicate gravimetric analysis for precursor solutions containing 100 g/L $TiOSO_4$ ("High"—bar 400), 50 g/L $TiOSO_4$ ("Medium"—bar 402), and 10 g/L $TiOSO_4$ ("Low"—bar 404). The error bars represent two standard deviations for each triplicate measurement. The titanium dioxide content in the hybrid Ti-GAC media was about 13.5 wt %, 11 wt %, and 8 wt % for the precursor solutions containing 100 g/L $TiOSO_4$, 50 g/L $TiOSO_4$, and 10 g/L $TiOSO_4$, respectively. Thus, in this range of concentrations, a higher $TiOSO_4$ concentration in the precursor solution resulted in a higher $TiO_2$ content in the resulting hybrid Ti-GAC media.

Figure 5:
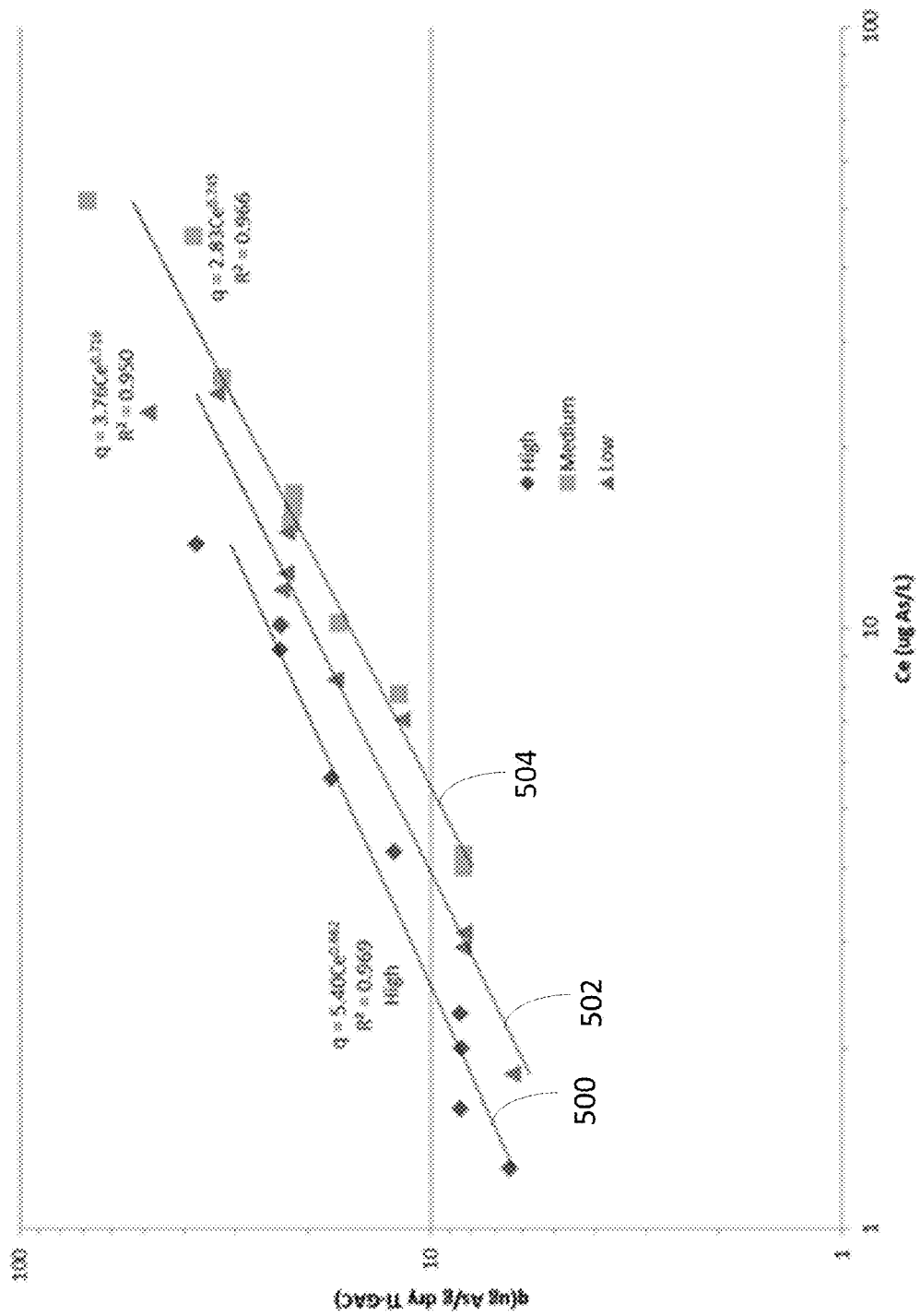
FIG. 5 is a graph showing arsenic adsorption capacity of hybrid Ti-GAC media prepare as described in Example 1.

FIG. 5 is a graph showing plots of arsenic adsorption of hybrid Ti-GAC media formed with precursor solutions containing 100 g/L $TiOSO_4$ ("High"—plot 500), 50 g/L $TiOSO_4$ ("Medium"—plot 502), and 10 g/L TiOSO$_4$ ("Low"—plot 504) as described with respect to FIG. 4, and placed in 10 mM NaHCO$_3$ buffered ultrapure water with pH=8.1±0.35 and initial arsenate concentration of 110 μg/L. As seen in FIG. 5, hybrid Ti-GAC with a higher TiO$_2$ content (and thus a higher TiOSO$_4$ concentration in the precursor solution) adsorbed more arsenic that hybrid Ti-GAC media with a lower TiO$_2$ content.

Example 2

Figure 6:
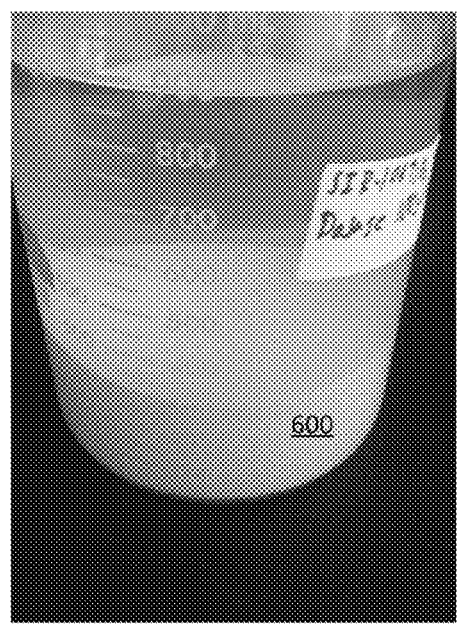
FIG. 6 is a photographic image of titanium dioxide containing ion exchange (hybrid Ti-HIX) media after washing and decanting as described in Example 2.

Example 1 was repeated with RESINTECH SIR-100 ion-exchange media rather than GAC to yield an ion exchange media containing titanium dioxide (hybrid Ti-HIX media). FIG. 6 shows hybrid Ti-HIX media 600 (ion exchange media containing titanium dioxide) after washing and decanting the hybrid media. This hybrid media is suitable for simultaneous removal of strong acid anions and oxo-anions from solution.

Figure 7:
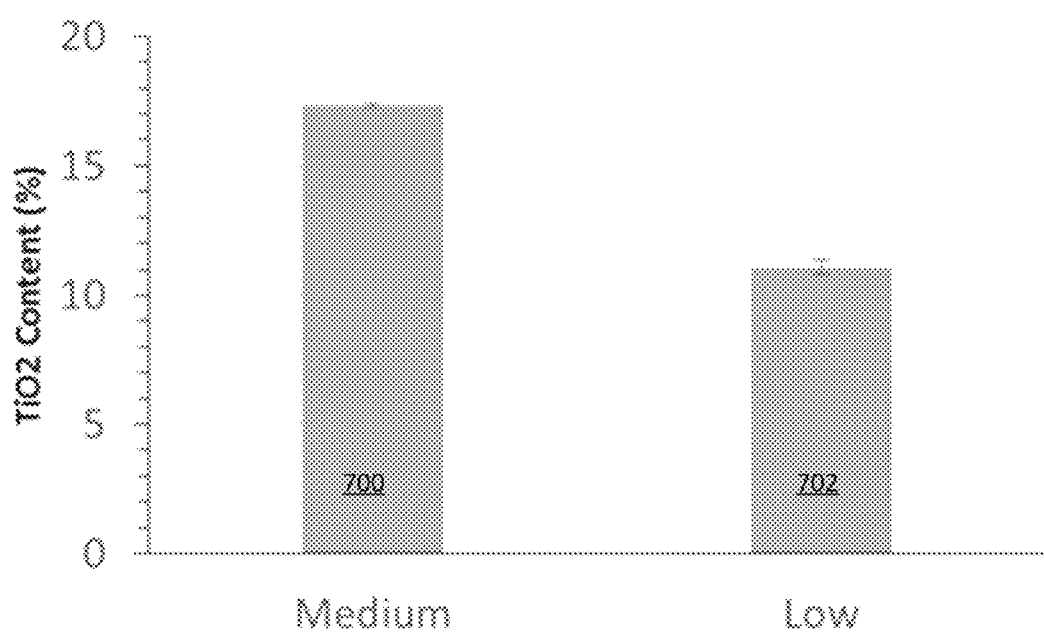
FIG. 7 is a bar graph showing titanium dioxide content in hybrid Ti-HIX media prepared as described in Example 2.

FIG. 7 is a bar graph showing titanium dioxide content in the hybrid Ti-HIX media as determined by triplicate gravimetric analysis for precursor solutions containing 50 g/L TiOSO$_4$ ("Medium"—bar 700), and 10 g/L TiOSO$_4$ ("Low"—bar 702). The error bars represent two standard deviations for each triplicate measurement. The titanium dioxide content in the hybrid Ti-GAC media was about 17 wt % and 11 wt % for the precursor solutions containing 50 g/L TiOSO$_4$ and 10 g/L TiOSO$_4$, respectively. Thus, a higher TiOSO$_4$ concentration in the precursor solution resulted in a higher TiO$_2$ content in the resulting hybrid Ti-HIX media.

Comparison of FIGS. 4 and 7 indicates that an initial precursor concentration of 50 g/L TiOSO$_4$ yields a hybrid media with about 11 wt % TiO$_2$ and about 17 wt % TiO$_2$ for the granular activated carbon and the ion exchange media, respectively, while an initial precursor concentration of 10 g/L TiOSO$_4$ yields a hybrid media with about 8 wt % TiO$_2$ and about 11 wt % TiO$_2$ for the granular activated carbon and the ion exchange media, respectively. Thus, the titanium dioxide content of the hybrid media depends at least in part on the type of base media used, as well as the initial concentration of the precursor solution.

A number of embodiments of the invention have been described. Nevertheless, it will be understood that various modifications may be made without departing from the spirit and scope of the invention. Accordingly, other embodiments are within the scope of the following claims.

What is claimed is:

1. A method of synthesizing hybrid media, the method comprising:

combining a metal precursor solution with particulate media to yield a mixture, wherein the particulate media comprises activated carbon based media;

decanting the mixture to yield a decanted mixture;

heating the decanted mixture in via microwave radiation to yield hybrid media, wherein the hybrid media comprises a metal dioxide derived from the metal precursor;

rinsing the hybrid media with water;

soaking the rinsed hybrid media in a salt solution;

rinsing the soaked hybrid media with water; and placing the hybrid media in contact with contaminated water comprising organic compounds, weak acid oxo-anions, or a combination thereof, wherein the hybrid media removes at least some of the organic compounds and the weak acid oxo-anions from the contaminated water.

2. The method of claim 1, further comprising preparing the metal precursor solution before combining the metal precursor solution with the particulate media.

3. The method of claim 1, wherein the weak acid oxo-anions are selected from the group consisting of arsenate, arsenite, chromate, and phosphate.

4. The method of claim 1, wherein the metal of the metal precursor is titanium or zirconium.

5. The method of claim 1, wherein the anion of the metal precursor is an oxosulfate, oxonitrate, or oxochloride.

6. The method of claim 1, wherein the decanted mixture is heated to a temperature of at least 100° C.

7. The method of claim 1, further comprising washing the rinsed hybrid media until metal dioxide particles are not visible in the wash water.

8. The method of claim 1, wherein the concentration of the metal precursor solution is between 1 g/L and 124 g/L of the metal precursor.

9. The method of claim 1, wherein the volume ratio of the metal precursor solution to the particulate media is in a range of 1:1 to 3:1.

10. The method of claim 1, wherein the salt solution is a sodium chloride solution.

11. The method of claim 10, wherein the sodium chloride solution is 1 wt % to 10 wt % sodium chloride.

12. The method of claim 1, wherein rinsing the hybrid media with water comprises rinsing the hybrid media with water until the rinse water is free of metal dioxide particles.

13. The method of claim 1, further comprising ashing the rinsed, soaked hybrid media to yield a porous nanostructured metal oxide.

14. The method of claim 13, wherein ashing the rinsed, soaked hybrid media comprises heating the rinsed, soaked hybrid media to a temperature in a range between 500° C. and 600° C.

* * * * *